United States Patent
Maeda

(10) Patent No.: US 10,797,304 B2
(45) Date of Patent: Oct. 6, 2020

(54) ALL-SOLID-STATE SECONDARY BATTERY

(71) Applicant: ZEON CORPORATION, Chiyoda-ku, Tokyo (JP)

(72) Inventor: Kouichirou Maeda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/556,981

(22) PCT Filed: Feb. 3, 2016

(86) PCT No.: PCT/JP2016/053185
§ 371 (c)(1),
(2) Date: Sep. 8, 2017

(87) PCT Pub. No.: WO2016/152262
PCT Pub. Date: Sep. 29, 2016

(65) Prior Publication Data
US 2018/0062162 A1 Mar. 1, 2018

(30) Foreign Application Priority Data

Mar. 25, 2015 (JP) ................................. 2015-062297
Mar. 25, 2015 (JP) ................................. 2015-062298

(51) Int. Cl.
| | | |
|---|---|---|
| *H01M 4/137* | (2010.01) | |
| *H01M 10/0562* | (2010.01) | |
| *H01M 10/0585* | (2010.01) | |
| *H01M 4/131* | (2010.01) | |
| *H01M 4/1393* | (2010.01) | |
| *H01M 4/36* | (2006.01) | |
| *H01M 4/62* | (2006.01) | |
| *H01M 4/66* | (2006.01) | |
| *H01M 10/42* | (2006.01) | |

(52) U.S. Cl.
CPC .......... *H01M 4/137* (2013.01); *H01M 4/131* (2013.01); *H01M 4/1393* (2013.01); *H01M 4/364* (2013.01); *H01M 4/622* (2013.01); *H01M 4/625* (2013.01); *H01M 4/663* (2013.01); *H01M 10/0562* (2013.01); *H01M 10/0585* (2013.01); *H01M 10/4228* (2013.01)

(58) Field of Classification Search
CPC ......... H01M 10/0562; H01M 10/0585; H01M 10/4228; H01M 4/131; H01M 4/137; H01M 4/1393; H01M 4/364; H01M 4/622; H01M 4/625; H01M 4/663

See application file for complete search history.

(56) References Cited

U.S. PATENT DOCUMENTS

| | | | | |
|---|---|---|---|---|
| 9,276,263 B2* | 3/2016 | Yoshida | ................. | H01B 1/122 |
| 2001/0012591 A1* | 8/2001 | Michot | ................. | C07C 311/48 |
| | | | | 429/339 |
| 2001/0036579 A1* | 11/2001 | Hosoya | ................. | H01M 4/131 |
| | | | | 429/231.95 |
| 2013/0040206 A1 | 2/2013 | Yoshida et al. | | |
| 2013/0143145 A1* | 6/2013 | Godden | ................. | H01M 8/20 |
| | | | | 429/482 |
| 2014/0127579 A1* | 5/2014 | Yoshida | ................. | H01B 1/122 |
| | | | | 429/217 |
| 2015/0086875 A1* | 3/2015 | Yoshida | ............ | H01M 10/0525 |
| | | | | 429/322 |
| 2018/0254519 A1 | 9/2018 | Maeda et al. | | |

FOREIGN PATENT DOCUMENTS

| | | | | |
|---|---|---|---|---|
| EP | 3352278 A1 | 7/2018 | | |
| JP | S59151770 A | 8/1984 | | |
| JP | 4134617 B2 | 8/2008 | | |
| JP | 2009176484 A | 8/2009 | | |
| JP | 2009211950 A | 9/2009 | | |
| JP | 2013008611 A | 1/2013 | | |
| JP | 2013157084 A | 8/2013 | | |
| WO | 2011105574 A1 | 9/2011 | | |
| WO | 2012173089 A1 | 12/2012 | | |
| WO | WO-2013146916 A1 * | 10/2013 | ............ | H01M 4/139 |

OTHER PUBLICATIONS

May 10, 2016, International Search Report issued in the International Patent Application No. PCT/JP2016/053185.
Sep. 26, 2017, International Preliminary Report on Patentability issued in the International Patent Application No. PCT/JP2016/053185.
Oct. 17, 2018, the Extended European Search Report issued by the European Patent Office in the corresponding European Patent Application No. 16768165.9.

* cited by examiner

*Primary Examiner* — Adam A Arciero
(74) *Attorney, Agent, or Firm* — Kenja IP Law PC

(57) ABSTRACT

An all-solid-state secondary battery includes a positive electrode having a positive electrode active material layer, a negative electrode having a negative electrode active material layer, and a solid electrolyte layer between the positive and negative electrode active material layers. The solid electrolyte layer has a thickness of 2 to 20 μm. The solid electrolyte layer includes a binder containing a particulate polymer having an average particle diameter of 0.1 to 1 μm.

13 Claims, No Drawings

ALL-SOLID-STATE SECONDARY BATTERY

TECHNICAL FIELD

The present invention relates to an all-solid-state secondary battery such as an all-solid-state lithium ion secondary battery.

In recent years, demand for a secondary battery such as a lithium ion battery has been increasing in a variety of applications such as a domestic small power storage device, an electric motorcycle, an electric vehicle, and a hybrid electric vehicle in addition to a portable terminal such as a portable information terminal or a portable electronic device.

With spread of the applications, further improvement of safety of a secondary battery is required. In order to ensure safety, a method for preventing liquid leakage, and a method for using a solid electrolyte in place of a combustible organic solvent electrolyte are useful.

As the solid electrolyte, a polymer solid electrolyte using polyethylene oxide or the like is known (Patent Literature 1). However, the polymer solid electrolyte is a combustible material. As the solid electrolyte, an inorganic solid electrolyte formed of an inorganic material has been also proposed (Patent Literature 2 or the like). An inorganic solid electrolyte is a solid electrolyte formed of an inorganic substance and is a non-combustible material as compared with a polymer solid electrolyte, and has very high safety as compared with an organic solvent electrolyte usually used. As described in Patent Literature 2, development of an all-solid-state secondary battery with high safety using an inorganic solid electrolyte is progressing.

An all-solid-state secondary battery includes an inorganic solid electrolyte layer as an electrolyte layer between a positive electrode and a negative electrode. Patent Literatures 3 and 4 describe an all solid-state lithium secondary battery having a solid electrolyte layer formed by a method for applying a solid electrolyte layer slurry composition containing a solid electrolyte particle and a solvent onto a positive electrode or a negative electrode and drying the composition (application method). When an electrode or an electrolyte layer is formed by the application method, the viscosity or the fluidity of a slurry composition containing an active material or an electrolyte needs to be in a range of conditions making application possible. On the other hand, it is important for an electrode and an electrolyte layer formed by applying a slurry composition and then drying a solvent to include an additive other than an active material and an electrolyte, such as a binder in order to exhibit a characteristic as a battery. Therefore, Patent Literature 5 has proposed use of an acrylate-based polymer for a binder.

CITATION LIST

Patent Literature

Patent Literature 1: JP 4134617 B2
Patent Literature 2: JP 59-151770 A
Patent Literature 3: JP 2009-176484 A
Patent Literature 4: JP 2009-211950 A
Patent Literature 5: WO 2011/105574 A

SUMMARY OF INVENTION

Technical Problem

However, according to studies by the present inventors, all-solid-state lithium secondary batteries described in Patent Literatures 3 and 4 may have an insufficient battery capacity characteristic or cycle characteristic due to insufficient ion conductivity in a solid electrolyte layer or an active material layer. In addition, Patent Literature 5 has proposed an all-solid-state secondary battery having an excellent battery characteristic. However, a battery having a higher characteristic is required.

An object of the present invention is to provide an all-solid-state secondary battery having a good battery characteristic.

Solution to Problem

The present inventors made intensive studies. As a result, the present inventors have found that the above object can be achieved by using a binder containing a particulate polymer having a specific particle diameter, and have completed the present invention.

That is, the present invention provides:

(1) an all-solid-state secondary battery including a positive electrode having a positive electrode active material layer, a negative electrode having a negative electrode active material layer, and a solid electrolyte layer between the positive electrode active material layer and the negative electrode active material layer, in which the solid electrolyte layer has a thickness of 2 to 20 μm, and the solid electrolyte layer includes a binder containing a particulate polymer having an average particle diameter of 0.1 to 1 μm;

(2) the all-solid-state secondary battery described in (1), obtained by using a binder composition having the particulate polymer dispersed in an organic solvent;

(3) the all-solid-state secondary battery described in (1) or (2), in which the solid electrolyte layer contains solid electrolyte particles, and the solid electrolyte particles contain 10 to 40 wt % of particles having a particle diameter of 0.1 μm or more and less than 1.0 μm and 60 to 90 wt % of particles having a particle diameter of 1.0 μm or more and less than 20 μm;

(4) the all-solid-state secondary battery described in any one of (1) to (3), in which the particulate polymer has a gel structure;

(5) the all-solid-state secondary battery described in (3), in which the solid electrolyte particles are formed of a sulfide glass constituted by $Li_2S$ and $P_2S_5$;

(6) the all-solid-state secondary battery described in any one of (1) to (5), in which the binder contains 10 to 90 wt % of the particulate polymer; and (7) the all-solid-state secondary battery described in any one of (1) to (6), in which the particulate polymer is an acrylate-based polymer containing a monomer unit derived from a (meth)acrylate.

Advantageous Effects of Invention

According to the present invention, a solid electrolyte battery having good charge-discharge performance can be obtained by using a particulate polymer having a specific particle diameter as a binder. It is considered that this is because use of a binder having a specific particle diameter increases the number of contact points or a contact area between solid electrolyte particles, and can provide an all-solid-state secondary battery having a small internal resistance consequently.

DESCRIPTION OF EMBODIMENTS (All-Solid-State Secondary Battery)

An all-solid-state secondary battery of the present invention includes a positive electrode having a positive electrode active material layer, a negative electrode having a negative electrode active material layer, and a solid electrolyte layer between the positive and negative electrode active material layers. The solid electrolyte layer has a thickness of 2 to 20 μm, and includes a binder containing a particulate polymer having an average particle diameter of 0.1 to 1 μm. The positive electrode has a positive electrode active material layer on a current collector, and the negative electrode has a negative electrode active material layer on a current collector. Hereinafter, (1) the solid electrolyte layer, (2) the positive electrode active material layer, and (3) the negative electrode active material layer will be described in this order.

(1) Solid Electrolyte Layer

The solid electrolyte layer is formed by applying a solid electrolyte layer slurry composition containing solid electrolyte particles and a binder onto a positive electrode active material layer or a negative electrode active material layer described below, and drying the composition. Here, the binder contains a particulate polymer having an average particle diameter of 0.1 to 1 μm. The solid electrolyte layer slurry composition is manufactured by mixing solid electrolyte particles, a binder, an organic solvent, and other components added as necessary.

(Solid Electrolyte Particles)

A solid electrolyte which has been ground is used. Therefore, the solid electrolyte is particulate, but is not perfectly spherical but unshaped. In general, the size of a fine particle is measured by a method for measuring scattered light by irradiating a particle with a laser beam, for example. However, the particle diameter in this case is a value obtained by assuming that the shape of one particle is spherical. When a plurality of particles is measured together, a presence ratio of particles having a corresponding particle diameter can be indicated as a particle size distribution. A solid electrolyte particle to form a solid electrolyte layer is often indicated by a value measured by this method as an average particle diameter.

The average particle diameter of solid electrolyte particles is preferably from 0.3 to 10 μm, more preferably from 0.5 to 10 μm, and still more preferably from 0.5 to 1.3 μm from a viewpoint of being able to obtain a solid electrolyte layer slurry composition having excellent dispersibility and coatability. Note that the average particle diameter of solid electrolyte particles is a number average particle diameter which can be determined by measuring a particle size distribution by laser diffraction.

Note that solid electrolyte particles including two kinds of particles belonging to different particle diameter ranges may be used as solid electrolyte particles. In this case, it is preferable to combine 10 to 40 wt % of solid electrolyte particles having a particle diameter of 0.1 μm or more and less than 1.0 μm and 90 to 60 wt % of solid electrolyte particles having a particle diameter of 1.0 μm or more and less than 20 μm.

When solid electrolyte particles including two kinds of particles belonging to different particle diameter ranges are used, the particle size distribution of the solid electrolyte particles may be monomodal or multimodal. For example, by mixing a plurality of kinds of solid electrolyte particles having different average particle diameters, it is possible to obtain 10 to 40 wt % of particles having a particle diameter of 0.1 μm or more and less than 1.0 μm and 90 to 60 wt % of particles having a particle diameter of 1.0 μm or more and less than 20 μm as solid electrolyte particles having a multimodal particle size distribution.

The solid electrolyte particles are not particularly limited as long as having conductivity of a lithium ion, but preferably contain a crystalline inorganic lithium ion conductor or an amorphous inorganic lithium ion conductor.

Examples of the crystalline inorganic lithium ion conductor include $Li_3N$, $LISICON(Li_{14}Zn(GeO_4)_4)$, perovskite type $Li_{0.5}La_{0.5}TiO_3$, $LIPON(Li_{3+y}PO_{4-x}N_x)$, and Thio-LISICON($Li_{3.25}Ge_{0.25}P_{0.75}S_4$).

The amorphous inorganic lithium ion conductor is not particularly limited as long as containing S (sulfur atom) and having ionic conductivity (sulfide solid electrolyte material). Here, when the all-solid-state secondary battery of the present invention is an all-solid-state lithium secondary battery, examples of a sulfide solid electrolyte material used include a material obtained by using a raw material composition containing $Li_2S$ and a sulfide of an element belonging to groups 13 to 15. Examples of a method for synthesizing a sulfide solid electrolyte material using such a raw material composition include an amorphization method. Examples of the amorphization method include a mechanical milling method and a melt quenching method, and the mechanical milling method is particularly preferable. This is because the mechanical milling method makes it possible to perform a treatment at room temperature and to simplify a manufacturing process.

Examples of the above element belonging to groups 13 to 15 include Al, Si, Ge, P, As, and Sb. Specific examples of a sulfide of an element belonging to groups 13 to 15 include $Al_2S_3$, $SiS_2$, $GeS_2$, $P_2S_3$, $P_2S_5$, $As_2S_3$, and $Sb_2S_3$. Among these sulfides, a sulfide belonging to group 14 or 15 is preferably used in the present invention. Particularly, in the present invention, the sulfide solid electrolyte material obtained by using a raw material composition containing $Li_2S$ and a sulfide of an element belonging to groups 13 to 15 is preferably a $Li_2S$—$P_2S_5$ material, a $Li_2S$—$SiS_2$ material, a $Li_2S$—$GeS_2$ material, or a $Li_2S$—$Al_2S_3$ material, and more preferably a $Li_2S$—$P_2S_5$ material. This is because these materials have excellent Li ion conductivity.

In addition, the sulfide solid electrolyte material in the present invention preferably contains crosslinking sulfur. This is because inclusion of crosslinking sulfur increases ion conductivity. Furthermore, when the sulfide solid electrolyte material contains crosslinking sulfur, usually, reactivity with a positive electrode active material is high, and a high resistance layer is easily generated. However, a binder containing a particulate polymer having a specific particle diameter is used in the present invention. Therefore, it is possible to sufficiently exhibit an effect of the present invention that occurrence of a high resistance layer can be suppressed. Note that "inclusion of crosslinking sulfur" can be determined, for example, by considering a measurement result of a Raman spectrum, a raw material composition ratio, and a measurement result of NMR.

The molar fraction of $Li_2S$ in a $Li_2S$—$P_2S_5$ material or a $Li_2S$—$Al_2S_3$ material is, for example, in a range of 50 to 74%, preferably in a range of 60 to 74% from a viewpoint of being able to obtain a sulfide solid electrolyte material containing crosslinking sulfur more surely.

The sulfide solid electrolyte material in the present invention may be a sulfide glass or a crystallized sulfide glass obtained by subjecting the sulfide glass to a heat treatment. The sulfide glass can be obtained by the above-described amorphization method, for example. The crystallized sulfide glass can be obtained by subjecting a sulfide glass to a heat treatment, for example.

Particularly, in the present invention, the sulfide solid electrolyte material is preferably a crystallized sulfide glass represented by $Li_7P_3S_{11}$. This is because the crystallized sulfide glass represented by $Li_7P_3S_{11}$ has particularly excellent Li ion conductivity. As a method for synthesizing $Li_7P_3S_{11}$, for example, $Li_2S$ and $P_2S_5$ are mixed at a molar ratio of 70:30, are amorphized with a ball mill to synthesize a sulfide glass, and the resulting sulfide glass is subjected to a heat treatment at 150° C. to 360° C. to synthesize $Li_7P_3S_{11}$.

(Binder)

A binder is used for binding solid electrolyte particles to each other to form a solid electrolyte layer. It is known in Patent Literature 5 or the like that an acrylate-based polymer is suitable as a binder. Here, use of an acrylate-based polymer as a binder is preferable because a voltage resistance can be increased and an energy density of an all-solid-state secondary battery can be increased. However, higher performance is demanded.

An acrylate-based polymer can be obtained by a solution polymerization method, an emulsion polymerization method, or the like. A polymer usually obtained is a linear polymer, which is soluble in an organic solvent. When such a polymer is used as a binder, the polymer is dissolved in an organic solvent to be used.

In general, a linear polymer is used as a binder in order to obtain a high binding force. However, when a binder completely covers surfaces of solid electrolyte particles, ion conductivity at a contact point is reduced. Therefore, a binder containing a particulate polymer is used in the present invention.

As the kind of a polymer used as a binder, an acrylate-based polymer is preferable. The acrylate-based polymer is a polymer containing a repeating unit (polymerization unit) obtained by polymerizing an acrylate or a methacrylate (hereinafter, also abbreviated as "(meth)acrylate") and a derivative thereof, and is a polymer containing a monomer unit derived from a (meth)acrylate. Specific examples thereof include a (meth)acrylate homopolymer, a (meth) acrylate copolymer, and a copolymer of a (meth)acrylate and another monomer copolymerizable with the (meth)acrylate.

Examples of the (meth)acrylate include an alkyl acrylate such as methyl acrylate, ethyl acrylate, n-propyl acrylate, isopropyl acrylate, n-butyl acrylate, t-butyl acrylate, 2-ethylhexyl acrylate, or benzyl acrylate; an alkoxyalkyl acrylate such as 2-methoxyethyl acrylate or 2-ethoxyethyl acrylate; a 2-(perfluoroalkyl) ethyl acrylate such as 2-(perfluorobutyl) ethyl acrylate or 2-(perfluoropentyl) ethyl acrylate; an alkyl methacrylate such as methyl methacrylate, ethyl methacrylate, n-propyl methacrylate, isopropyl methacrylate, n-butyl methacrylate, t-butyl methacrylate, 2-ethylhexyl methacrylate, lauryl methacrylate, tridecyl methacrylate, stearyl methacrylate, or benzyl methacrylate; and a 2-(perfluoroalkyl) ethyl methacrylate such as 2-(perfluorobutyl) ethyl methacrylate or 2-(perfluoropentyl) ethyl methacrylate. Among these (meth)acrylates, an alkyl acrylate such as methyl acrylate, ethyl acrylate, n-propyl acrylate, isopropyl acrylate, n-butyl acrylate, t-butyl acrylate, 2-ethylhexyl acrylate, or benzyl acrylate; and an alkoxyalkyl acrylate such as 2-methoxyethyl acrylate or 2-ethoxyethyl acrylate are preferable due to high adhesion to a solid electrolyte in the present invention.

A content ratio of a monomer unit derived from a (meth) acrylate in the acrylate-based polymer is usually 40% by mass or more, preferably 50% by mass or more, and more preferably 60% by mass or more. Note that an upper limit of a content ratio of a monomer unit derived from a (meth) acrylate in the acrylate-based polymer is usually 100% by mass or less, and preferably 95% by mass or less.

The acrylate-based polymer can be a copolymer of a (meth)acrylate and a monomer copolymerizable with the (meth)acrylate. Examples of the copolymerizable monomer include an unsaturated carboxylic acid such as acrylic acid, methacrylic acid, itaconic acid, or fumaric acid; a carboxylate having two or more carbon-carbon double bonds such as ethylene glycol dimethacrylate, diethylene glycol dimethacrylate, or trimethylolpropane triacrylate; a styrene-based monomer such as styrene, vinyl toluene, t-butyl styrene, vinyl benzoate, methyl vinyl benzoate, vinyl naphthalene, hydroxymethyl styrene, α-methyl styrene, or divinylbenzene; an amide-based monomer such as acrylamide, methacrylamide, N-methylol acrylamide, or acrylamide-2-methylpropane sulfonic acid; an α,β-unsaturated nitrile compound such as acrylonitrile or methacrylonitrile; an olefin such as ethylene or propylene; a diene-based monomer such as butadiene or isoprene; a vinyl ester such as vinyl acetate, vinyl propionate, vinyl butyrate, or vinyl benzoate; a vinyl ether such as methyl vinyl ether, ethyl vinyl ether, or butyl vinyl ether; a vinyl ketone such as methyl vinyl ketone, ethyl vinyl ketone, butyl vinyl ketone, hexyl vinyl ketone, or isopropenyl vinyl ketone; and a heterocyclic ring-containing vinyl compound such as N-vinyl pyrrolidone, vinyl pyridine, or vinyl imidazole. Among these monomers, a styrene-based monomer, an amide-based monomer, and an α,β-unsaturated nitrile compound are preferable from a viewpoint of dissolubility in an organic solvent. A content ratio of the copolymerizable monomer unit in the acrylate-based polymer is usually 40% by mass or less, preferably 30% by mass or less, and more preferably 20% by mass or less.

The particulate polymer in the present invention is a polymer which is in a form of particles when being dispersed in an organic solvent, and is also in a form of particles when being dried.

The particulate polymer preferably has a gel structure. An index indicating that a gel structure is contained is a gel fraction. The gel fraction is a value indicating a weight ratio of a component insoluble in an organic solvent due to bonding, entanglement, or the like of polymer chains with respect to the entire components. When a particulate polymer having a gel structure is used in the present invention, the gel fraction is preferably from 50 to 95%, and more preferably from 70 to 85%. When the gel fraction is in the above range, a phenomenon that flowing occurs easily at a high temperature due to an excessively low gel fraction can be suppressed, and a phenomenon that a binding force as a binder is decreased due to an excessively high gel fraction can be suppressed.

Examples of a method for obtaining a particulate polymer include a method for polymerizing a monomer together with a crosslinking agent when a polymer is subjected to emulsion polymerization or dispersion polymerization in an aqueous or solvent system. In order to obtain a particulate polymer, a crosslinking agent is preferably copolymerized in polymerization.

In order to give a gel structure to a particulate polymer, a compound generally capable of acting as a crosslinking agent or a monomer capable of forming a self-crosslinking structure is copolymerized in polymer polymerization. In order to adjust the gel fraction in a predetermined range, a crosslinking agent is preferably copolymerized in polymerization.

Examples of the crosslinking agent include a monomer containing a plurality of double bonds. Examples thereof include a polyfunctional acrylate compound such as polyethylene glycol diacrylate, polypropylene glycol diacrylate, trimethylol propane trimethacrylate, pentaerythritol tetraacrylate, or ethylene glycol dimethacrylate; and a polyfunctional aromatic compound such as divinylbenzene. Ethylene glycol dimethacrylate, divinylbenzene, and the like are preferable.

The use amount of a crosslinking agent depends on the kind thereof, but is preferably from 0.01 to 8 parts by mass, more preferably from 0.01 to 5 parts by mass, still more preferably from 0.05 to 5 parts by mass, and particularly preferably from 0.05 to 1 part by mass with respect to 100 parts by mass of the total amount of monomers.

When the addition amount of a crosslinking agent is in the above range, a phenomenon that a binder spreads in a hemispherical shape on a surface of a substrate, the area of an adhesion portion becomes ten times or more of a particle diameter, and a state the same as covering surfaces of solid electrolyte particles is obtained due to an excessively small addition amount of the crosslinking agent when the binder is dried on the substrate can be suppressed, and a phenomenon that an adhesion force of a polymer is lowered due to an excessively large addition amount of the crosslinking agent and a function as a binder is not exhibited can be suppressed.

Examples of the monomer capable of forming a self-crosslinking structure include a diene-based monomer such as butadiene or isoprene; and an unsaturated nitrile compound such as acrylonitrile. Acrylonitrile is preferably copolymerized.

The average particle diameter of the particulate polymer is from 0.1 to 1 µm, and preferably from 0.15 to 0.70 µm. A particulate polymer having an average particle diameter in the above range makes it possible to obtain a solid electrolyte battery having good charge-discharge performance. It is considered that this is because use of a particulate polymer having an average particle diameter in the above range increases the number of contact points or a contact area between solid electrolyte particles, and can reduce an internal resistance consequently. Note that the average particle diameter of the particulate polymer is a number average particle diameter which can be determined by measuring a particle size distribution by laser diffraction.

A binder used in the present invention may contain a binding component other than the particulate polymer. The content of a particulate polymer in the binder used in the present invention is preferably from 10 to 90 wt %, and more preferably from 20 to 80 wt % from a viewpoint of being able to obtain a solid electrolyte battery having good charge-discharge performance.

In the present invention, the particulate polymer having a gel structure and a polymer having no gel structure may be used together as a binder.

Incidentally, as the polymer having no gel structure, in the above acrylate-based polymer, a polymer obtained by not copolymerizing a compound capable of acting as a crosslinking agent or a monomer capable of forming a self-crosslinking structure in polymer polymerization, that is, a polymer having no gel structure can be used.

A method for manufacturing an acrylate-based polymer can be any one of polymerization methods in a dispersion system, such as a suspension polymerization method, a bulk polymerization method, and an emulsion polymerization method. The polymerization method may be any one of ion polymerization, radical polymerization, living radical polymerization, and the like. Examples of a polymerization initiator used in polymerization include an organic peroxide such as lauroyl peroxide, diisopropyl peroxydicarbonate, di-2-ethylhexyl peroxydicarbonate, t-butyl peroxypivalate, or 3,3,5-trimethyl hexanoyl peroxide; an azo compound such as $\alpha,\alpha'$-azobisisobutyronitrile; ammonium persulfate; and potassium persulfate.

The glass transition temperature (Tg) of the binder is preferably from −50 to 25° C., more preferably from −45 to 15° C., and particularly preferably from −40 to 5° C. from a viewpoint of being able to obtain an all-solid-state secondary battery having excellent strength and flexibility, and a high output characteristic. Note that the glass transition temperature of the binder can be adjusted by combining various monomers.

The content of the binder in the solid electrolyte layer slurry composition is preferably from 0.1 to 10 parts by mass, more preferably from 0.5 to 7 parts by mass, and particularly preferably from 0.5 to 5 parts by mass with respect to 100 parts by mass of the solid electrolyte particles from a viewpoint of being able to suppress an increase in a resistance of the solid electrolyte layer by inhibiting transfer of lithium while maintaining a binding property between solid electrolyte particles.

(Organic Solvent)

Examples of the organic solvent include a cycloaliphatic hydrocarbon such as cyclopentane or cyclohexane; an aromatic hydrocarbon such as toluene or xylene; an ether such as dimethyl ether, methyl ethyl ether, diethyl ether, or cyclopentyl methyl ether; and an ester such as ethyl acetate or butyl acetate. These solvents can be appropriately selected to be used singly or in combination of two or more kinds thereof from a viewpoint of a drying speed and environment.

The content of an organic solvent in the solid electrolyte layer slurry composition is preferably from 10 to 700 parts by mass, and more preferably from 30 to 500 parts by mass with respect to 100 parts by mass of the solid electrolyte particles from a viewpoint of being able to obtain an excellent coating characteristic while maintaining dispersibility of solid electrolyte particles in the solid electrolyte layer slurry composition.

The solid electrolyte layer slurry composition may contain a component having functions of a dispersing agent, a leveling agent, and an defoaming agent as other components added as necessary in addition to the above components. These components are not particularly limited as long as having no influence on a battery reaction.

(Dispersing Agent)

Examples of the dispersing agent include an anionic compound, a cationic compound, a nonionic compound, and a polymer compound. The dispersing agent is selected according to solid electrolyte particles used. The content of the dispersing agent in the solid electrolyte layer slurry composition is preferably in a range having no influence on a battery characteristic, and is specifically 10 parts by mass or less with respect to 100 parts by mass of the solid electrolyte particles.

(Leveling Agent)

Examples of the leveling agent include a surfactant such as an alkyl-based surfactant, a silicone-based surfactant, a fluorine-based surfactant, or a metal-based surfactant. By mixing the above surfactant, it is possible to prevent repelling which occurs when the solid electrolyte layer slurry composition is applied onto a surface of a positive electrode active material layer or a negative electrode active material layer described below, and to improve smoothness of positive and negative electrodes. The content of the leveling agent in the solid electrolyte layer slurry composition is preferably in a range having no influence on a battery characteristic, and is specifically 10 parts by mass or less with respect to 100 parts by mass of the solid electrolyte particles.

(Defoaming Agent)

Examples of the defoaming agent include a mineral oil-based defoaming agent, a silicone-based defoaming agent, and a polymer-based defoaming agent. The defoaming agent is selected according to solid electrolyte particles used. The content of the defoaming agent in the solid electrolyte layer slurry composition is preferably in a range having no influence on a battery characteristic, and is specifically 10 parts by mass or less with respect to 100 parts by mass of the solid electrolyte particles.

(2) Positive Electrode Active Material Layer

The positive electrode active material layer is formed by applying a positive electrode active material layer slurry composition containing a positive electrode active material, solid electrolyte particles, and a positive electrode binder onto a surface of a current collector described below, and drying the composition. The positive electrode active material layer slurry composition is manufactured by mixing a positive electrode active material, solid electrolyte particles, a positive electrode binder, an organic solvent, and other components added as necessary.

(Positive Electrode Active Material)

The positive electrode active material is a compound capable of occluding and releasing a lithium ion. The positive electrode active material is roughly classified into a material formed of an inorganic compound and a material formed of an organic compound.

Examples of the positive electrode active material formed of an inorganic compound include a transition metal oxide, a composite oxide of lithium and a transition metal, and a transition metal sulfide. Examples of the above transition metal include Fe, Co, Ni, and Mn. Specific examples of an inorganic compound used for the positive electrode active material include a lithium-containing composite metal oxide such as $LiCoO_2$, $LiNiO_2$, $LiMnO_2$, $LiMn_2O_4$, $LiFePO_4$, or $LiFeVO_4$; a transition metal sulfide such as $TiS_2$, $TiS_3$, or amorphous $MoS_2$; and a transition metal oxide such as $Cu_2V_2O_3$, amorphous $V_2O$—$P_2O_5$, $MoO_3$, $V_2O_5$, or $V_6O_{13}$. These compounds may have been subjected to partial element substitution.

Examples of the positive electrode active material formed of an organic compound include polyaniline, polypyrrole, polyacene, a disulfide-based compound, a polysulfide-based compound, and an N-fluoro pyridinium salt. The positive electrode active material may be a mixture of the above inorganic compound and an organic compound.

The average particle diameter of the positive electrode active material used in the present invention is usually from 0.1 to 50 μm, and preferably from 1 to 20 μm from viewpoints of improving a battery characteristic such as a load characteristic or a cycle characteristic, being able to obtain an all-solid-state secondary battery having a large charge-discharge capacity, easily handling a positive electrode active material layer slurry composition, and easily handling in manufacturing a positive electrode. The average particle diameter can be determined by measuring a particle size distribution by laser diffraction.

(Solid Electrolyte Particles)

As the solid electrolyte particles, those exemplified in the solid electrolyte layer can be used.

A weight ratio between the positive electrode active material and the solid electrolyte particles (positive electrode active material:solid electrolyte particles) is preferably from 90:10 to 50:50, and more preferably from 60:40 to 80:20. When the weight ratio of the positive electrode active material is in the above range, a phenomenon that the amount of the positive electrode active material in a battery is reduced due to an excessively small weight ratio of the positive electrode active material, leading to reduction in a capacity as a battery can be suppressed. When the weight ratio of the solid electrolyte particles is in the above range, a phenomenon that conductivity cannot be obtained sufficiently due to an excessively small weight ratio of the solid electrolyte particles, and the positive electrode active material cannot be used effectively, leading to reduction in a capacity as a battery can be suppressed.

(Positive Electrode Binder)

As the positive electrode binder, those exemplified in the solid electrolyte layer can be used.

The content of the positive electrode binder in the positive electrode active material layer slurry composition is preferably from 0.1 to 5 parts by mass, and more preferably from 0.2 to 4 parts by mass with respect to 100 parts by mass of the positive electrode active material from a viewpoint of being able to prevent a positive electrode active material from falling from an electrode without inhibiting a battery reaction.

As an organic solvent and other components added as necessary in the positive electrode active material layer slurry composition, similar compounds to those exemplified in the above solid electrolyte layer can be used. The content of the organic solvent in the positive electrode active material layer slurry composition is preferably from 20 to 80 parts by mass, and more preferably from 30 to 70 parts by mass with respect to 100 parts by mass of the positive electrode active material from a viewpoint of being able to obtain an excellent coating characteristic while maintaining dispersibility of a solid electrolyte.

The positive electrode active material layer slurry composition may contain an additive exhibiting various functions, such as a conductive agent or a reinforcing material as other components added as necessary in addition to the above components. These components are not particularly limited as long as having no influence on a battery reaction.

(Conductive Agent)

The conductive agent is not particularly limited as long as being able to impart conductivity, but usual examples thereof include carbon powder such as acetylene black, carbon black, or graphite, and fibers and foils of various metals.

(Reinforcing Material)

As the reinforcing material, various inorganic and organic spherical, plate-shaped, rod-shaped, or fibrous fillers can be used.

(3) Negative Electrode Active Material Layer

The negative electrode active material layer contains a negative electrode active material.

(Negative Electrode Active Material)

Examples of the negative electrode active material include an allotrope of carbon, such as graphite or coke. The negative electrode active material formed of an allotrope of carbon can be also used in a form of a mixture with a metal, a metal salt, an oxide, or the like, or a cover material. Further, an oxide and a sulfate of silicon, tin, zinc, manganese, iron, nickel, or the like, metallic lithium, a lithium alloy such as Li—Al, Li—Bi—Cd, or Li—Sn—Cd, a lithium transition metal nitride, and silicon can be used as the negative electrode active material. When a metal material is used, a metal foil or a metal plate can be used as an electrode as it is, but the metal material may be used in a form of particles.

In this case, the negative electrode active material layer is formed by applying a negative electrode active material layer slurry composition containing a negative electrode active material, solid electrolyte particles, and a negative electrode binder onto a surface of a current collector described below, and drying the composition. The negative electrode active material layer slurry composition is manufactured by mixing a negative electrode active material, solid electrolyte particles, a negative electrode binder, an organic solvent, and other components added as necessary. As the solid electrolyte particles, the organic solvent and other components added as necessary in the negative electrode active material slurry composition, similar compounds to those exemplified in the above positive electrode active material layer can be used.

When the negative electrode active material is in a form of particles, the average particle diameter of the negative electrode active material is usually from 1 to 50 µm, and preferably from 15 to 30 µm from a viewpoint of improving a battery characteristic such as an initial efficiency, a load characteristic, or a cycle characteristic.

A weight ratio between the negative electrode active material and the solid electrolyte particles (negative electrode active material:solid electrolyte particles) is preferably from 90:10 to 50:50, and more preferably from 60:40 to 80:20. When the weight ratio of the negative electrode active material is in the above range, a phenomenon that the amount of the negative electrode active material in a battery is reduced due to an excessively small weight ratio of the negative electrode active material, leading to reduction in a capacity as a battery can be suppressed. When the weight ratio of the solid electrolyte particles is in the above range, a phenomenon that conductivity cannot be obtained sufficiently due to an excessively small weight ratio of the solid electrolyte particles, and the negative electrode active material cannot be used effectively, leading to reduction in a capacity as a battery can be suppressed.

(Negative Electrode Binder)

When the negative electrode active material is in a form of particles, those exemplified in the solid electrolyte layer can be used as the negative electrode binder.

When the negative electrode active material is in a form of particles, the content of the negative electrode binder in the negative electrode active material slurry composition is preferably from 0.1 to 5 parts by mass, and more preferably from 0.2 to 4 parts by mass with respect to 100 parts by mass of the negative electrode active material from a viewpoint of preventing an electrode active material from falling from an electrode without inhibiting a battery reaction.

(Current Collector)

The current collector used for forming the positive electrode active material layer or the negative electrode active material layer is not particularly limited as long as being a material having electrical conductivity and electrochemical durability. However, for example, a metal material such as iron, copper, aluminum, nickel, stainless steel, titanium, tantalum, gold, or platinum is preferable from a viewpoint of heat resistance. Among the materials, aluminum is particularly preferable as a positive electrode, and copper is particularly preferable as a negative electrode. The shape of the current collector is not particularly limited, but a sheet-shaped current collector having a thickness of about 0.001 to 0.5 mm is preferable. The current collector is preferably subjected to a roughening treatment in advance to be used in order to enhance a bonding strength between the above-described positive and negative electrode active material layers. Examples of a roughening method include a mechanical polishing method, an electrolytic polishing method, and a chemical polishing method. In the mechanical polishing method, abrasive cloth and paper to which abrasive grains have been fixed, a grindstone, an emery wheel, a wire brush provided with a steel wire or the like are used. In addition, in order to enhance a bonding strength between the current collector and the positive or negative electrode active material layers and conductivity, an intermediate layer may be formed on a surface of the current collector.

(Manufacture of Solid Electrolyte Layer Slurry Composition)

The solid electrolyte layer slurry composition is obtained by mixing the above-described solid electrolyte particles, binder, organic solvent, and other components added as necessary.

(Manufacture of Positive Electrode Active Material Layer Slurry Composition)

The positive electrode active material layer slurry composition is obtained by mixing the above-described positive electrode active material, solid electrolyte particles, positive electrode binder, organic solvent, and other components added as necessary.

(Manufacture of Negative Electrode Active Material Layer Slurry Composition)

The negative electrode active material layer slurry composition is obtained by mixing the above-described negative electrode active material, solid electrolyte particles, negative electrode binder, organic solvent, and other components added as necessary.

A method for mixing the above slurry composition is not particularly limited. However, examples thereof include a method using a mixing apparatus such as a stirring type apparatus, a shaking type apparatus, or a rotary type apparatus. Examples thereof further include a method using a dispersion kneading apparatus such as a homogenizer, a ball mill, a bead mill, a planetary mixer, a sand mill, a roll mill, or a planetary kneader. A method using a planetary mixer, a ball mill, or a bead mill is preferable from a viewpoint of being able to suppress aggregation of the solid electrolyte particles.

(All-Solid-State Secondary Battery)

The all-solid-state secondary battery of the present invention includes a positive electrode having a positive electrode active material layer, a negative electrode having a negative electrode active material layer, and a solid electrolyte layer between the positive and negative electrode active material layers. The thickness of the solid electrolyte layer is from 2 to 20 µm, preferably from 3 to 15 µm, and more preferably from 5 to 12 µm. The thickness of the solid electrolyte layer in the above range can reduce an internal resistance of the all-solid-state secondary battery. The solid electrolyte layer having a too thin thickness easily causes short circuit of the all-solid-state secondary battery. The solid electrolyte layer having a too thick thickness increases an internal resistance of the battery.

A positive electrode in the all-solid-state secondary battery of the present invention is manufactured by forming a positive electrode active material layer by applying the above positive electrode active material layer slurry composition onto a current collector, and drying the composition. When a metal foil is used as a negative electrode in the all-solid-state secondary battery of the present invention, the metal foil can be used as it is. When the negative electrode active material is in a form of particles, a negative electrode is manufactured by forming a negative electrode active material layer by applying the above negative electrode active material layer slurry composition onto a current collector different from the current collector of the positive electrode, and drying the composition. Subsequently, a solid electrolyte layer slurry composition is applied onto the formed positive electrode active material layer or negative electrode active material layer, and the composition is dried to form a solid electrolyte layer. Then, by bonding an electrode in which a solid electrolyte layer has not been formed to the above electrode in which a solid electrolyte layer has been formed, an all-solid-state secondary battery device is manufactured.

A method for applying a positive electrode active material layer slurry composition and a negative electrode active material layer slurry composition onto a current collector is not particularly limited, but examples thereof include a doctor blade method, a dip method, a reverse roll method, a direct roll method, a gravure method, an extrusion method, and a brush coating method. The application amount is not particularly limited, but is such an amount that the thickness of an active material layer formed after an organic solvent is removed is usually from 5 to 300 μm, and preferably from 10 to 250 μm. A drying method is not particularly limited, but examples thereof include drying with warm air, hot air, or low humidity air, vacuum drying, and drying by irradiation with a (far) infrared ray, an electron beam, or the like. A drying condition is usually adjusted such that an organic solvent volatilizes as soon as possible in a speed range which does not cause cracking in an active material layer due to stress concentration and does not cause an active material layer to peel from a current collector. Furthermore, the dried electrode may be pressed to be stabilized. Examples of a press method include a mold press method and a calender press method, but are not limited thereto.

Drying is performed at a temperature at which an organic solvent volatilizes sufficiently. Specifically, the drying temperature is preferably from 50 to 250° C., and more preferably from 80 to 200° C. from a viewpoint of being able to form an excellent active material layer without causing thermal decomposition of positive and negative electrode binders. Drying time is not particularly limited, but drying is usually performed in a range of 10 to 60 minutes.

A method for applying a solid electrolyte layer slurry composition onto a positive electrode active material layer or a negative electrode active material layer is not particularly limited, but a method similar to the above-described method for applying a positive electrode active material layer slurry composition and a negative electrode active material layer slurry composition onto a current collector is used. However, a gravure method is preferable from a viewpoint of being able to form a thin film solid electrolyte layer. The application amount is not particularly limited, but is such an amount that the thickness of a solid electrolyte layer formed after an organic solvent is removed is usually from 2 to 20 μm, and preferably from 3 to 15 μm. A drying method, a drying condition, and a drying temperature are also similar to those for the above-described positive electrode active material layer slurry composition and negative electrode active material layer slurry composition.

Furthermore, the above laminate obtained by bonding an electrode in which a solid electrolyte layer has been formed to an electrode in which a solid electrolyte layer has not been formed may be pressurized. A pressurizing method is not particularly limited, but examples thereof include flat plate press, roll press, and cold isostatic press (CIP). The pressure for pressure press is preferably from 5 to 700 MPa, and more preferably from 7 to 500 MPa from a viewpoint of exhibiting an excellent battery characteristic due to a low resistance at an interface between an electrode and a solid electrolyte layer, and a low contact resistance between particles in each layer. Note that a solid electrolyte layer and an active material layer may be compressed by press, and the thickness thereof may be thinner than that before press. When press is performed, the thickness after press of each of the solid electrolyte layer and the active material layer in the present invention only needs to be in the above range.

It is not particularly limited whether a solid electrolyte layer slurry composition is applied onto a positive electrode active material layer or a negative electrode active material layer. However, the solid electrolyte layer slurry composition is preferably applied onto an active material layer having a larger particle diameter of an electrode active material to be used. When the particle diameter of an electrode active material is large, unevenness is formed on a surface of an active material layer. Therefore, by applying the slurry composition thereonto, the unevenness on the surface of the active material layer can be relieved. Accordingly, when lamination is performed by bonding an electrode in which a solid electrolyte layer has been formed to an electrode in which a solid electrolyte layer has not been formed, a contact area between the solid electrolyte layer and an electrode is increased, and an interface resistance can be suppressed.

The resulting all-solid-state secondary battery device is left as it is, is wound, is bent, or the like in accordance with a battery shape, is put in a battery container, and is sealed to obtain an all-solid-state secondary battery. An overcurrent prevention device such as an expand metal, a fuse, or a PTC device, a lead plate, or the like is put in the battery container as necessary, and an increase in pressure in the battery and overcharge-overdischarge can be prevented. The shape of a battery may be any one of a coin type, a button type, a sheet type, a cylinder type, a rectangular shape, and a flat type.

EXAMPLES

Hereinafter, the present invention will be described with reference to Examples, but the present invention is not limited in any way by these Examples. Characteristics are evaluated by the following methods. Note that "part" and "%" in these Examples mean "part by mass" and "% by mass" unless otherwise particularly specified.

<Measurement of thickness of solid electrolyte layer>

In accordance with JIS K5600-1-7:1999, the thicknesses of a solid electrolyte layer in a cross section of a pressed all-solid-state secondary battery were measured randomly at 10 points using a scanning electron microscope (S-4700 manufactured by Hitachi High-Tech Fielding Corporation) at a magnification of 5000, and the thickness of the solid electrolyte layer was calculated from an average value thereof.

<Measurement of Particle Diameter>

In accordance with JIS Z8825-1:2001, a cumulative 50% particle diameter (number average particle diameter) from a fine particle side of a cumulative particle size distribution was measured with a laser analysis apparatus (laser diffraction type particle size distribution measuring apparatus SALD-3100 manufactured by Shimadzu Corporation).

<Battery Characteristic: Output Characteristic>

In each of Examples 1 to 3 and Comparative Examples 1 and 2, 5 cells of all-solid-state secondary batteries were charged to 4.3 V by a 0.1 C constant current method, and were then discharged to 3.0 V at 0.1 C to determine a 0.1 C discharge capacity a. Thereafter, the 5 cells of all-solid-state secondary batteries were charged to 4.3 V at 0.1 C, and were then discharged to 3.0 V at 5 C to determine a 5 C discharge capacity b. An average value of the 5 cells was used as a measurement value, and a capacity retention ratio represented by a ratio of an electric capacity between the 5 C discharge capacity b and the 0.1 C discharge capacity a (b/a (%)) was determined.

In each of Examples 4 to 8, 5 cells of all-solid-state secondary batteries were charged to 4.3 V by a 0.1 C constant current method, and were then discharged to 3.0 V at 0.1 C to determine a 0.1 C discharge capacity a. Thereafter, the 5 cells of all-solid-state secondary batteries were charged to 4.3 V at 0.1 C, and were then discharged to 3.0 V at 10 C to determine a 10 C discharge capacity c. An average value of the 5 cells was used as a measurement value, and a capacity retention ratio represented by a ratio of an electric capacity between the 10 C discharge capacity c and the 0.1 C discharge capacity a (c/a (%)) was determined.

<Battery Characteristic: Charge-Discharge Cycle Characteristic>

The resulting all-solid-state secondary batteries were subjected to a charge-discharge cycle in which the all-solid-state secondary batteries were charged to 4.2 V at a constant current by a constant-current constant-voltage charging method of 0.5 C at 25° C., then charged at a constant voltage, and then discharged to 3.0 V at a constant current of 0.5 C. The charge-discharge cycle was performed up to 50 cycles. A ratio of a discharge capacity in the 50th cycle with respect to an initial discharge capacity was determined as a capacity retention ratio. As this value is larger, a decrease in capacity due to repeated charge-discharge is less. That is, it is indicated that deterioration of an active material and a binder can be suppressed due to a small internal resistance, and a charge-discharge cycle characteristic is excellent.

Example 1

<Manufacture of Particulate Polymer>

Into a 5 MPa pressure-resistant container with a stirrer, 30 parts of ethyl acrylate, 70 parts of butyl acrylate, 1 part of ethylene glycol dimethacrylate (EGDMA) as a crosslinking agent, 1 part of sodium dodecylbenzenesulfonate as an emulsifier, 150 parts of deionized water, and 0.5 parts of potassium persulfate as a polymerization initiator were put, and stirred sufficiently. Thereafter, the resultant mixture was heated to 70° C. and polymerization was started. When the polymerization conversion reached 96%, cooling was started, and the reaction was stopped to obtain an aqueous dispersion of a particulate polymer. The average particle diameter thereof was 0.24 μm.

Then, the pH was adjusted to 7 by adding a 10 wt % NaOH aqueous solution to the resulting aqueous dispersion.

The solid concentration of the resulting aqueous dispersion of a particulate polymer was 38 wt %. To 100 parts by mass of the resulting aqueous dispersion, 500 parts by mass of cyclopentyl methyl ether was added. The pressure was reduced with a rotary evaporator while the temperature of a water bath was 80° C., and solvent exchange and a dehydration operation were performed.

By the dehydration operation, a particulate polymer organic solvent dispersion having a water concentration of 38 ppm and a solid concentration of 7.5 wt % was obtained.

<Manufacture of Positive Electrode Active Material Layer Slurry Composition>

100 parts of lithium cobaltate (average particle diameter: 11.5 μm) as a positive electrode active material, 150 parts of a sulfide glass ($Li_2S/P_2S_5$=70 mol %/30 mol %, number average particle diameter: 0.4 μm) constituted by $Li_2S$ and $P_2S_5$ as solid electrolyte particles, 13 parts of acetylene black as a conductive agent, 3 parts of a solid content of a cyclopentyl methyl ether dispersion of a particulate polymer, and 1 part of a polymer having Mw=150000, obtained by copolymerization of butyl acrylate and ethyl acrylate at 60/40 were added. Furthermore, the solid concentration was adjusted to 78% by adding cyclopentyl methyl ether as an organic solvent, and mixing was then performed using a planetary mixer for 60 minutes. Furthermore, the solid concentration was adjusted to 74% by adding cyclopentyl methyl ether, and mixing was then performed for 10 minutes to prepare a positive electrode active material layer slurry composition.

<Manufacture of Negative Electrode Active Material Layer Slurry Composition>

100 parts of graphite (average particle diameter: 20 μm) as a negative electrode active material, 50 parts of a sulfide glass ($Li_2S/P_2S_5$=70 mol %/30 mol %, number average particle diameter: 0.4 μm) constituted by $Li_2S$ and $P_2S_5$ as solid electrolyte particles, 3 parts of a solid content of a cyclopentyl methyl ether dispersion of a particulate polymer, and 1 part of a polymer having Mw=150000, obtained by copolymerization of butyl acrylate and ethyl acrylate at 60/40 were mixed. Furthermore, the solid concentration was adjusted to 60% by adding cyclopentyl methyl ether as an organic solvent, and mixing was then performed using a planetary mixer to prepare a negative electrode active material layer slurry composition.

<Manufacture of Solid Electrolyte Layer Slurry Composition>

100 parts of a sulfide glass ($Li_2S/P_2S_5$=70 mol %/30 mol %, number average particle diameter: 1.2 μm, cumulative 90% particle diameter: 2.1 μm) constituted by $Li_2S$ and $P_2S_5$ as solid electrolyte particles, 3 parts of a solid content of a cyclopentyl methyl ether dispersion of a particulate polymer, and 1 part of a polymer having Mw=150000, obtained by copolymerization of butyl acrylate and ethyl acrylate at 60/40 were mixed. Furthermore, the solid concentration was adjusted to 30% by adding cyclopentyl methyl ether as an organic solvent, and mixing was then performed using a planetary mixer to prepare a solid electrolyte layer slurry composition.

<Manufacture of all-Solid-State Secondary Battery>

The above positive electrode active material layer slurry composition was applied onto a surface of a current collector, and was dried (110° C., 20 minutes) to form a positive electrode active material layer having a thickness of 50 μm. A positive electrode was thereby manufactured. The above negative electrode active material layer slurry composition was applied onto a surface of another current collector, and was dried (110° C., 20 minutes) to form a negative electrode active material layer having a thickness of 30 μm. A negative electrode was thereby manufactured.

Subsequently, the above solid electrolyte layer slurry composition was applied onto a surface of the above positive electrode active material layer, and the composition was dried (110° C., 10 minutes) to form a solid electrolyte layer having a thickness of 18 μm.

The solid electrolyte layer laminated on the surface of the positive electrode active material layer and the above negative electrode active material layer of the negative electrode were bonded to each other, and were pressed to obtain an all-solid-state secondary battery. The thickness of the solid electrolyte layer of the all-solid-state secondary battery after press was 11 μm. An output characteristic and a charge-discharge cycle characteristic were evaluated using this battery. Table 1 indicates results thereof.

Example 2

An all-solid-state secondary battery was manufactured in a similar manner to Example 1 except that the following solid electrolyte particles were used, and evaluation was performed. Table 1 indicates results thereof.

In Example 2, a sulfide glass ($Li_2S/P_2S_5$=70 mol %/30 mol %, number average particle diameter: 0.8 μm, cumulative 90% particle diameter: 1.8 μm) constituted by $Li_2S$ and $P_2S_5$ was used as solid electrolyte particles. The thicknesses of the solid electrolyte layer before and after press were 20 μm and 13 μm, respectively.

Example 3

Measurement was performed in a similar manner to Example 1 except that the following polymer was used as a particulate polymer. Table 1 indicates results thereof.

Into a 5 MPa pressure-resistant container with a stirrer, 20 parts of butyl acrylate, 60 parts of 2-ethylhexyl acrylate, 20 parts of styrene, 1 part of divinylbenzene (DVB) as a crosslinking agent, 1 part of sodium dodecylbenzenesulfonate as an emulsifier, 150 parts of deionized water, and 0.5 parts of potassium persulfate as a polymerization initiator were put, and stirred sufficiently. Thereafter, the resultant mixture was heated to 70° C. and polymerization was started. When the polymerization conversion reached 96%, cooling was started, and the reaction was stopped to obtain an aqueous dispersion of a particulate polymer. The average particle diameter thereof was 0.28 μm.

Then, the pH was adjusted to 7 by adding a 10 wt % NaOH aqueous solution to the resulting aqueous dispersion.

The solid concentration of the resulting aqueous dispersion of a particulate polymer was 38 wt %. To 100 parts by mass of the resulting aqueous dispersion, 500 parts by mass of cyclopentyl methyl ether was added. The pressure was reduced with a rotary evaporator while the temperature of a water bath was 80° C., and solvent exchange and a dehydration operation were performed.

By the dehydration operation, a particulate polymer organic solvent dispersion having a water concentration of 21 ppm and a solid concentration of 8.5 wt % was obtained. A solid electrolyte layer was prepared in a similar manner to Example 1 using the above particulate polymer. The thicknesses of the solid electrolyte layer before and after press were 20 μm and 18 μm, respectively.

Comparative Example 1

As for the particulate polymer in Example 1, polymerization was performed similarly without addition of a crosslinking agent. The resulting particulate polymer had an average particle diameter of 0.32 μm. This particulate polymer was subjected to solvent exchange into cyclopentyl methyl ether to obtain a polymer solution in which the particulate polymer was dissolved and did not contain particles. A solid electrolyte layer was prepared using this polymer solution. The thicknesses of the solid electrolyte layer before and after press were 33 μm and 25 μm, respectively. A battery was prepared in a similar manner to Example 1 using the above polymer, and a test was performed. Table 1 indicates results thereof.

Comparative Example 2

As for the particulate polymer in Example 3, polymerization was performed similarly without addition of a crosslinking agent. The resulting particulate polymer had an average particle diameter of 0.28 μm. This particulate polymer was subjected to solvent exchange into cyclopentyl methyl ether to obtain a polymer solution in which the particulate polymer was dissolved and did not contain particles. A solid electrolyte layer was prepared using this polymer solution. The thicknesses of the solid electrolyte layer before and after press were 33 μm and 12 μm, respectively. A battery was prepared in a similar manner to Example 3 using the above polymer, and a test was performed. Table 1 indicates results thereof.

Example 4

<Manufacture of Particulate Polymer Having Gel Structure>

Into a glass container with a stirrer, 55 parts of ethyl acrylate, 45 parts of butyl acrylate, 1 part of ethylene glycol dimethacrylate as a crosslinking agent, 1 part of sodium dodecylbenzenesulfonate as an emulsifier, 150 parts of deionized water, and 0.5 parts of potassium persulfate as a polymerization initiator were put, and stirred sufficiently. Thereafter, the resultant mixture was heated to 70° C. and polymerization was started. When the polymerization conversion reached 96%, cooling was started, and the reaction was stopped to obtain an aqueous dispersion of a particulate polymer having a gel structure. The average particle diameter thereof was 0.26 μm.

Then, the pH was adjusted to 7 by adding a 10 wt % NaOH aqueous solution to the resulting aqueous dispersion.

The resulting aqueous dispersion of the polymer was dried using a PTFE petri dish to prepare a film. The resulting film was immersed in THF for 24 hours, and was then filtered through a 200-mesh SUS wire gauze. The wire gauze after the filtration was dried at 100° C. for 1 hour. When a value obtained by dividing the weight increase of the wire gauze by the weight of the film was assumed to be a gel fraction, the gel fraction was 95 wt %.

After completion of the polymerization reaction, in order to exchange unreacted monomers and water as the solvent for an organic solvent, xylene was added to the aqueous dispersion of the polymer having a pH adjusted to 7 such that the amount of xylene was 500 parts by mass with respect to 100 parts by mass of a solid content of the polymer. The resulting mixture was subjected to heat reduced pressure distillation to obtain a xylene dispersion of a particulate polymer having a gel structure.

<Manufacture of Polymer Having No Gel Structure>

Into a 5 MPa pressure-resistant container with a stirrer, 55 parts of ethyl acrylate, 45 parts of butyl acrylate, 1 part of sodium dodecylbenzenesulfonate as an emulsifier, 150 parts of deionized water, and 0.5 parts of potassium persulfate as a polymerization initiator were put, and stirred sufficiently. Thereafter, the resultant mixture was heated to 70° C. and polymerization was started. When the polymerization conversion reached 97%, cooling was started, and the reaction was stopped to obtain an aqueous dispersion of a polymer.

Then, the pH was adjusted to 7 by adding a 10 wt % NaOH aqueous solution to the resulting aqueous dispersion.

Subsequently, in order to exchange unreacted monomers and water as the solvent for an organic solvent, 500 parts by mass of xylene was added with respect to 100 parts by mass of a solid content of the polymer. The resulting mixture was subjected to heat reduced pressure distillation to obtain a xylene solution of a polymer having no gel structure.

<Manufacture of Positive Electrode Active Material Layer Slurry Composition>

100 parts of lithium cobaltate (average particle diameter: 11.5 μm) as a positive electrode active material, 150 parts of a sulfide glass ($Li_2S/P_2S_5$=70 mol %/30 mol %, ratio of particles having a particle diameter of 0.1 μm or more and less than 1.0 μm: 35%, ratio of particles having a particle diameter of 1.0 μm or more and less than 20 μm: 65%, average particle diameter: 2.2 μm) constituted by $Li_2S$ and $P_2S_5$ as solid electrolyte particles, 13 parts of acetylene black as a conductive agent, 2 parts of a solid content of the above-described xylene dispersion of a particulate polymer having a gel structure as a positive electrode binder, and 1 part of a solid content of a xylene solution of a polymer having no gel structure were added. Furthermore, the solid concentration was adjusted to 78% using xylene as an organic solvent, and mixing was then performed using a planetary mixer for 60 minutes. Furthermore, the solid concentration was adjusted to 74% using xylene, and mixing was then performed for 10 minutes to prepare a positive electrode active material layer slurry composition.

<Manufacture of Negative Electrode Active Material Layer Slurry Composition>

100 parts of graphite (average particle diameter: 20 μm) as a negative electrode active material, 50 parts of a sulfide glass ($Li_2S/P_2S_5$=70 mol %/30 mol %, ratio of particles having a particle diameter of 0.1 μm or more and less than 1.0 μm: 35%, ratio of particles having a particle diameter of 1.0 μm or more and less than 20 μm: 65%, average particle diameter: 2.2 μm) constituted by $Li_2S$ and $P_2S_5$ as solid electrolyte particles, 2 parts of a solid content of the above-described xylene dispersion of a particulate polymer having a gel structure as a negative electrode binder, and 1 part of a solid content of a xylene solution of a polymer having no gel structure were added. Furthermore, the solid concentration was adjusted to 60% by adding xylene as an organic solvent, and mixing was then performed using a planetary mixer to prepare a negative electrode active material layer slurry composition.

<Manufacture of Solid Electrolyte Layer Slurry Composition>

100 parts of a sulfide glass ($Li_2S/P_2S_5$=70 mol %, ratio of particles having a particle diameter of 0.1 μm or more and less than 1.0 μm: 35%, ratio of particles having a particle diameter of 1.0 μm or more and less than 20 μm: 65%, average particle diameter: 2.2 μm) constituted by $Li_2S$ and $P_2S_5$ as solid electrolyte particles, 2 parts of a solid content of the above-described xylene dispersion of a particulate polymer having a gel structure as a binder, and 1 part of a solid content of a xylene solution of a polymer having no gel structure were added. Furthermore, the solid concentration was adjusted to 30% by adding xylene as an organic solvent, and mixing was then performed using a planetary mixer to prepare a solid electrolyte layer slurry composition.

<Manufacture of all-Solid-State Secondary Battery>

The above positive electrode active material layer slurry composition was applied onto a surface of a current collector, and was dried (110° C., 20 minutes) to form a positive electrode active material layer having a thickness of 50 μm. A positive electrode was thereby manufactured. The above negative electrode active material layer slurry composition was applied onto a surface of another current collector, and was dried (110° C., 20 minutes) to form a negative electrode active material layer having a thickness of 30 μm. A negative electrode was thereby manufactured.

Subsequently, the above solid electrolyte layer slurry composition was applied onto a surface of the above positive electrode active material layer, and the composition was dried (110° C., 10 minutes) to form a solid electrolyte layer having a thickness of 11 μm.

The solid electrolyte layer laminated on the surface of the positive electrode active material layer and the above negative electrode active material layer of the negative electrode were bonded to each other, and were pressed to obtain an all-solid-state secondary battery. The thickness of the solid electrolyte layer of the all-solid-state secondary battery after press was 9 μm. An output characteristic and a charge-discharge cycle characteristic were evaluated using this battery. Table 2 indicates results thereof.

Example 5

An all-solid-state secondary battery was manufactured in a similar manner to Example 4 except that a solid electrolyte layer slurry composition obtained below was used, and evaluation was performed. Note that the thickness of the solid electrolyte layer of the all-solid-state secondary battery after press was 7 μm. Table 2 indicates results thereof.

<Manufacture of Solid Electrolyte Layer Slurry Composition>

100 parts of a sulfide glass ($Li_2S/P_2S_5$=70 mol %/30 mol %, ratio of particles having a particle diameter of 0.1 μm or more and less than 1.0 μm: 15%, ratio of particles having a particle diameter of 1.0 μm or more and less than 20 μm: 85%, average particle diameter: 3.5 μm) constituted by $Li_2S$ and $P_2S_5$ as solid electrolyte particles, 2 parts of a solid content of the xylene dispersion of a particulate polymer having a gel structure and 1 part of a solid content of a xylene solution of a polymer having no gel structure in Example 4 as a binder were added. Furthermore, the solid concentration was adjusted to 30% by adding xylene as an organic solvent, and mixing was then performed using a planetary mixer to prepare a solid electrolyte layer slurry composition in Example 5. The solid electrolyte layer slurry composition had a viscosity of 100 mPa·s.

Example 6

An all-solid-state secondary battery was manufactured in a similar manner to Example 4 except that a solid electrolyte layer having a thickness of 18 μm was formed using a solid electrolyte slurry composition obtained below in manufacturing the all-solid-state secondary battery, and evaluation was performed. Note that the thickness of the solid electrolyte layer of the all-solid-state secondary battery after press was 14 μm. Table 2 indicates results thereof.

<Manufacture of Solid Electrolyte Layer Slurry Composition>

100 parts of a sulfide glass ($Li_2S/P_2S_5$=70 mol %/30 mol %, ratio of particles having a particle diameter of 0.1 μm or more and less than 1.0 μm: 20%, ratio of particles having a particle diameter of 1.0 μm or more and less than 20 μm: 80%, average particle diameter: 3.3 μm) constituted by $Li_2S$ and $P_2S_5$ as solid electrolyte particles, 2 parts of a solid content of a xylene dispersion of the particulate polymer having a gel structure and 5 parts of a solid content of a xylene solution of a polymer having no gel structure in Example 4 as a binder were added. Furthermore, the solid concentration was adjusted to 35% by adding xylene as an organic solvent, and mixing was then performed using a planetary mixer to prepare a solid electrolyte layer slurry composition in Example 6.

Example 7

A particulate polymer having a gel structure was manufactured in a similar manner to Example 4 except that the monomers were changed to 70 parts of 2-ethylhexyl acrylate and 30 parts of styrene in manufacturing the particulate polymer having a gel structure. The average particle diameter thereof was 0.25 μm. Note that the gel fraction of this polymer was 93 wt %. In addition, a solid electrolyte layer slurry composition was prepared in a similar manner to Example 6 except that 2 parts of a solid content of a xylene dispersion of the particulate polymer having a gel structure and 1 part of a solid content of a xylene solution of a polymer having no gel structure, similar to that used in Example 4, were used as a binder, and the solid concentration was adjusted to 30% in manufacturing the solid electrolyte layer slurry composition. An all-solid-state secondary battery was manufactured using the resulting solid electrolyte layer slurry composition in a similar manner to Example 6, and evaluation was performed. Note that the thickness of the solid electrolyte layer of the all-solid-state secondary battery after press was 12 μm. Table 2 indicates results thereof.

Example 8

A solid electrolyte layer slurry composition was prepared in a similar manner to Example 7 except that 2 parts of a solid content of a xylene dispersion of a particulate polymer having a gel structure, similar to that used in Example 7, and 3 parts of a solid content of a xylene solution of a polymer having no gel structure, similar to that used in Example 4, were used as a binder in manufacturing the solid electrolyte layer slurry composition. An all-solid-state secondary battery was manufactured using the resulting solid electrolyte layer slurry composition in a similar manner to Example 7, and evaluation was performed. Note that the thickness of the solid electrolyte layer of the all-solid-state secondary battery after press was 11 μm. Table 2 indicates results thereof.

TABLE 1

| | Particulate polymer | | | | | Solid electrolyte layer Thickness (after press) (μm) | Output characteristic Capacity retention ratio (%) | Charge-discharge cycle characteristic Capacity retention ratio (%) |
|---|---|---|---|---|---|---|---|---|
| | Ethyl acrylate (part) | Butyl acrylate (part) | 2-Ethylhexyl acrylate (part) | Styrene (part) | Crosslinking agent (kind, part) | Average particle diameter (μm) | | |
| Ex. 1 | 30 | 70 | 0 | 0 | EGDMA, 1 | 0.24 | 11 | 85 | 80 |
| Ex. 2 | 30 | 70 | 0 | 0 | EDGMA, 1 | 0.24 | 13 | 88 | 85 |
| Ex. 3 | 0 | 20 | 60 | 20 | DVB, 1 | 0.28 | 18 | 93 | 89 |
| Comp Ex. 1 | 30 | 70 | 0 | 0 | None | 0.32 | 25 | 56 | 76 |
| Comp Ex. 2 | 0 | 20 | 60 | 20 | None | 0.28 | 12 | 62 | 66 |

TABLE 2

| | Particulate polymer (particulate polymer having a gel structure) | | | | | | | Solid electrolyte layer slurry composition | | |
|---|---|---|---|---|---|---|---|---|---|---|
| | | | | | | | | Ratio of solid electrolyte particles of 0.1 to 1 μm (%) | Ratio of solid electrolyte particles of 1 to 20 μm (%) | Amount of particulate polymer having a gel structure (part) |
| | Ethyl acrylate (part) | Butyl acrylate (part) | 2-Ethylhexyl acrylate (part) | Styrene (part) | Cross-linking agent (part) | Gel fraction (%) | Average particle diameter (μm) | | | |
| Ex. 4 | 55 | 45 | 0 | 0 | 1 | 95 | 0.26 | 35 | 65 | 2 |
| Ex. 5 | 55 | 45 | 0 | 0 | 1 | 95 | 0.26 | 35 | 85 | 2 |
| Ex. 6 | 55 | 45 | 0 | 0 | 1 | 95 | 0.26 | 20 | 80 | 2 |
| Ex. 7 | 0 | 0 | 70 | 30 | 1 | 93 | 0.25 | 20 | 80 | 2 |
| Ex. 8 | 0 | 0 | 70 | 30 | 1 | 93 | 0.25 | 20 | 80 | 2 |

| | Solid electrolyte slurry composition | | | | |
|---|---|---|---|---|---|
| | Amount of polymer having no gel structure (part) | Solid concentration (%) | Solid electrolyte layer Thickness (after press) (μm) | Output characteristic Capacity retention ratio (%) | Charge-discharge cycle characteristic Capacity retention ratio (%) |
| Ex. 4 | 1 | 30 | 9 | 94 | 85 |
| Ex. 5 | 1 | 30 | 7 | 91 | 88 |
| Ex. 6 | 5 | 35 | 14 | 92 | 80 |
| Ex. 7 | 1 | 30 | 12 | 91 | 85 |
| Ex. 8 | 3 | 30 | 11 | 93 | 83 |

As Tables 1 and 2 indicate, an all-solid-state secondary battery including a positive electrode having a positive electrode active material layer, a negative electrode having a negative electrode active material layer, and a solid electrolyte layer between the positive and negative electrode active material layers, in which the solid electrolyte layer has a thickness of 2 to 20 μm, and includes a binder containing a particulate polymer having an average particle diameter of 0.1 to 1 μm, had an excellent output characteristic and charge-discharge cycle characteristic.

The invention claimed is:

1. An all-solid-state secondary battery comprising a positive electrode having a positive electrode active material layer, a negative electrode having a negative electrode active material layer, and a solid electrolyte layer between the positive electrode active material layer and the negative electrode active material layer, wherein
    the solid electrolyte layer has a thickness of 2 to 20 μm and
    the solid electrolyte layer includes a binder containing a particulate polymer having an average particle diameter of 0.1 to 1 μm, a gel fraction of 70 to 85% and Tg of −50 to 25° C.

2. The all-solid-state secondary battery according to claim 1, obtained by using a binder composition having the particulate polymer dispersed in an organic solvent.

3. The all-solid-state secondary battery according to claim 1, wherein the solid electrolyte layer contains solid electrolyte particles, and the solid electrolyte particles contain 10 to 40 wt % of particles having a particle diameter of 0.1 μm or more and less than 1.0 μm and 60 to 90 wt % of particles having a particle diameter of 1.0 μm or more and less than 20 μm.

4. The all-solid-state secondary battery according to claim 3, wherein the solid electrolyte particles are formed of a sulfide glass constituted by $Li_2S$ and $P_2S_5$.

5. The all-solid-state secondary battery according to claim 1, wherein the binder contains 10 to 90 wt % of the particulate polymer.

6. The all-solid-state secondary battery according to claim 1, wherein the particulate polymer is an acrylate-based polymer containing a monomer unit derived from a (meth)acrylate.

7. The all-solid-state secondary battery according to claim 6, wherein
    the particulate polymer includes a crosslinking agent of 0.01 to 8 parts by mass of a total amount of monomer units.

8. The all-solid-state secondary battery according to claim 7, wherein
    the particulate polymer includes a crosslinking agent of 0.01 to 5 parts by mass of a total amount of monomer units.

9. The all-solid-state secondary battery according to claim 8, wherein
    the particulate polymer includes a crosslinking agent of 0.05 to 1 part by mass of a total amount of monomer units.

10. The all-solid-state secondary battery according to claim 1, wherein
    the solid electrolyte layer has a thickness of 16 to 20 μm.

11. The all-solid-state secondary battery according to claim 1, wherein the particulate polymer has a gel structure.

12. The all-solid-state secondary battery according to claim 1, wherein the particulate polymer is obtained using dispersion polymerization.

13. The all-solid-state secondary battery according to claim 1, wherein the particulate polymer obtains a gel structure through copolymerization of a monomer capable of forming a self-crosslinking structure.

* * * * *